United States Patent
Lee et al.

(10) Patent No.: US 12,152,129 B2
(45) Date of Patent: Nov. 26, 2024

(54) METHOD FOR PREPARING READILY PROCESSABLE, THERMALLY-STABLE, PHOSPHORUS-CONTAINING FLAME RETARDANT MATERIAL

(71) Applicant: LANXESS Corporation, Pittsburgh, PA (US)

(72) Inventors: Julia Yue Lee, Naugatuck, CT (US); Qingliang He, Cheshire, CT (US)

(73) Assignee: LANXESS Corporation, Pittsburgh, PA (US)

( * ) Notice: Subject to any disclaimer, the term of this patent is extended or adjusted under 35 U.S.C. 154(b) by 453 days.

(21) Appl. No.: 17/415,883

(22) PCT Filed: Dec. 18, 2019

(86) PCT No.: PCT/US2019/067221
§ 371 (c)(1),
(2) Date: Jun. 18, 2021

(87) PCT Pub. No.: WO2020/132095
PCT Pub. Date: Jun. 25, 2020

(65) Prior Publication Data
US 2022/0081536 A1   Mar. 17, 2022

Related U.S. Application Data (60) Provisional application No. 62/782,907, filed on Dec. 20, 2018.

(51) Int. Cl.
| | | |
|---|---|---|
| *C08K 5/5317* | (2006.01) | |
| *C07F 9/38* | (2006.01) | |
| *C08K 3/22* | (2006.01) | |
| *C08K 3/40* | (2006.01) | |
| *C08K 5/00* | (2006.01) | |
| *C08K 5/3492* | (2006.01) | |
| *C08L 77/02* | (2006.01) | |
| *C08L 77/10* | (2006.01) | |

(52) U.S. Cl.
CPC .......... *C08K 5/5317* (2013.01); *C07F 9/3808* (2013.01); *C08K 3/22* (2013.01); *C08K 3/40* (2013.01); *C08K 5/0066* (2013.01); *C08K 5/34922* (2013.01); *C08L 77/02* (2013.01); *C08L 77/10* (2013.01); *C08K 2003/2206* (2013.01); *C08K 2003/2296* (2013.01); *C08K 2201/005* (2013.01); *C08L 2201/02* (2013.01)

(58) Field of Classification Search
CPC .............................. C08K 5/5317; C07F 9/3813
See application file for complete search history.

(56) References Cited

U.S. PATENT DOCUMENTS

| | | |
|---|---|---|
| 3,689,602 A | 9/1972 | Ismail |
| 3,894,986 A | 7/1975 | Racky et al. |
| 4,859,466 A | 8/1989 | Maier |
| 4,972,011 A | 11/1990 | Richardson et al. |
| 5,053,148 A | 10/1991 | von Bonin |
| 5,118,885 A | 6/1992 | Tokitoh et al. |
| 5,543,544 A | 8/1996 | Telschow |
| 5,780,534 A | 7/1998 | Kleiner et al. |
| 6,013,707 A | 1/2000 | Kleiner et al. |
| 6,255,371 B1 | 7/2001 | Schlosser et al. |
| 6,365,071 B1 | 4/2002 | Jenewein et al. |
| 6,472,448 B2 | 10/2002 | Witte et al. |
| 6,547,992 B1 | 4/2003 | Schlosser et al. |
| 7,622,517 B2 | 11/2009 | Bauer et al. |
| 8,889,773 B2 | 11/2014 | Zilberman et al. |
| 9,534,108 B2 | 1/2017 | Timberlake et al. |
| 9,745,449 B2 | 8/2017 | Stockdale et al. |
| 9,752,009 B2 | 9/2017 | Stockdale et al. |
| 9,752,011 B2 | 9/2017 | Stockdale et al. |
| 9,758,640 B2 | 9/2017 | Stockdale et al. |
| 9,765,204 B2 | 9/2017 | Timberlake et al. |
| 2006/0135391 A1 | 6/2006 | Drewes et al. |
| 2007/0029532 A1 | 2/2007 | Hansel et al. |
| 2009/0275682 A1* | 11/2009 | Furukawa ............... C08L 71/12 524/133 |
| 2014/0378671 A1 | 12/2014 | Brizius |
| 2015/0031805 A1 | 1/2015 | Stockdale et al. |
| 2016/0032076 A1 | 2/2016 | Stockdale et al. |
| 2019/0153197 A1 | 5/2019 | Krause et al. |
| 2019/0153322 A1* | 5/2019 | Bauer .................... C09K 21/12 |

FOREIGN PATENT DOCUMENTS

| | | |
|---|---|---|
| EP | 2479181 A1 | 7/2012 |
| JP | H06-321828 A | 11/1994 |
| JP | 2006-001876 A | 1/2006 |

OTHER PUBLICATIONS

International Search Report for International Application No. PCT/US2019/067721 dated Jun. 8, 2008, two pages.

* cited by examiner

Primary Examiner — Brieann R Johnston
(74) Attorney, Agent, or Firm — Nicanor A. Kohncke; Christopher L. McDavid; Alyson J. DiLena (57) ABSTRACT

The present disclosure provides for the production of non-halogenated phosphorus containing, thermally stable flame retardant materials directly in the form of a powder or small particles. The process generally includes heating one or more phosphonic acid salts in a high boiling, water miscible, acid stable solvent to dehydration reaction temperatures of 200° C. or higher.

19 Claims, 5 Drawing Sheets

METHOD FOR PREPARING READILY PROCESSABLE, THERMALLY-STABLE, PHOSPHORUS-CONTAINING FLAME RETARDANT MATERIAL

This application claims priority benefit to U.S. Provisional Application No. 62/782,907, filed Dec. 20, 2018, which is incorporated herein by reference in its entirety.

An improved process is disclosed for preparing phosphorus containing flame retardant materials with high thermal stability, comprising heating one or more phosphonic acid salts in a high boiling, water miscible, acid inert solvent at high temperatures, which process produces the flame retardant material directly in the form of a powder or small particles, i.e., without requiring or necessitating grinding, granulating, or other such physical processing.

BACKGROUND OF THE INVENTION

Polymers, such as polyolefins, polyesters, polycarbonates, polyamides, polyurethanes, epoxy resins, and other thermoplastic or thermoset polymer resins, are frequently made more flame retardant by incorporating therein a phosphorus-containing compound, a halogen-containing compound or a mixture thereof. U.S. Pat. No. 3,689,602, for example, discloses halogenated phosphoric acid esters as flame-retardant additives for plastics.

Some polymers are processed at high temperatures, for example, 200° C., 225° C., 250° C. 275° C. or higher. Many known flame retardants are not suitable under these conditions because they are too volatile, not sufficiently thermally stable, have an adverse effect on processing, etc. Certain organophosphorus flame retardant compounds, such as some phosphate esters, exhibit a plasticizing effect which may adversely affect mechanical properties of the polymers into which they are added. Compounds such as some phosphates may be relatively unstable to hydrolysis, resulting in undesired formation of various phosphoric acid compounds.

Salts of many phosphorus containing acids are known flame-retardant additives, useful in, e.g., thermoplastic polymers. U.S. Pat. No. 3,894,986 discloses flame retardant thermoplastic polyesters containing alkali salts of phosphonic acids, i.e., salts prepared from compounds of formula (X), wherein R is alkyl, e.g., the mono sodium salt of ethane-phosphonic acid or a sodium salt of a mono-methyl ester of an alkane-phosphonic acid. U.S. Pat. No. 4,972,011 discloses aluminum salts of alkylphosphonic acids or monoalkyl esters of alkane-phosphonic acids, i.e., salts of compounds of formula (Xa), wherein R is, e.g., alkyl or alkyl substituted by one or more halo or hydroxy groups; and R' is hydrogen, methyl, ethyl, propyl, or isopropyl.

US 2006/0138391 discloses, as flame retardants, salts formed from compounds of formula (X), which salts may contain any of a wide variety of metals. The only salt actually exemplified in US 2006/0138391 was the aluminum salt of methyl methylphosphonic acid, i.e., the aluminum salt of a compound of formula (Xa) above wherein R and R' are methyl.

DE 3833977 discloses metal salts prepared from compounds of formula (Xa) prepared from reactions of dimethylmethylphosphonate and metal oxides or hydroxides in water at high pressures and temperatures from 120° C. to 200° C.; reactions run in aqueous solution under elevated pressures at temperatures up to 190° C. in an autoclave are exemplified. Adducts of these salts with amines, such as ethylene diamine and melamine, and use of the adducts as flame retardants in thermoplastics are also disclosed.

Salts of phosphinic acids, i.e., compounds of formula (II) wherein R1 and R2 are alkyl or carbon based aromatic, are also known flame-retardant additives for thermoplastic polymers.

Salts wherein M is selected from Mg, Ca, Al, Sb, Sn, Ge, Ti, Zn, Fe, Zr, Ce, Bi, Li, Na, K or protonated nitrogen base are known. For example, U.S. Pat. Nos. 5,780,534 and 6,013,707 disclose that calcium phosphinates and aluminum phosphinates of Formula (II) are particularly effective in polyester, for example, calcium and aluminum salts of dimethylphosphinic acid, ethylmethylphosphinic acid, diethylphosphinic acid, n-propylmethylphosphinic acid, n-propylethylphosphinic acid, di-n-propylphosphinic acid, diisopropylphosphinic acid or diphenylphosphinic acid.

As is common with many flame retardant systems, the performance of phosphorus containing acid derivatives can be enhanced by the presence of other flame retardant agents, synergists and adjuvants. U.S. Pat. No. 6,472,448 discloses flame retardant rigid polyurethane foam wherein a combination of oxalkylated alkylphosphonic acids and ammonium polyphosphate is present as flame retardant.

U.S. Pat. No. 6,365,071 discloses a synergistic flame retardant combination for thermoplastic polymers, e.g., engineering plastics, especially polyesters, comprising A) a phosphinic salt of the formula (II) above, e.g., aluminum dimethylphosphinate, aluminum methylethylphosphinate, and aluminum methylpropylphosphinate and B) a nitrogen compound such as allantoin, benzoguanamine, glycoluril, urea cyanurate, melamine cyanurate and melamine phosphate.

U.S. Pat. No. 6,255,371 discloses a flame retardant combination comprising, A) a phosphinate of formula (II) above, e.g., a diethyl phosphinate where M is calcium, magnesium, aluminum and/or zinc, and B) condensation or reaction products of melamine e.g., melamine polyphosphate, melam polyphosphate and melem polyphosphate.

U.S. Pat. No. 6,547,992 discloses a flame retardant combination for thermoplastic polymers comprising phosphinates and small amounts of inorganic and/or mineral compounds which do not contain nitrogen. WO 2012/045414 discloses a flame retardant composition comprising A) a phosphinic salt of the formula (II) above wherein M is selected from Mg, Ca, Al, Sb, Sn, Ge, Ti, Zn, Fe, Zr, Ce, Bi, Li, Na, K or a protonated nitrogen base; and B) a metal salt of phosphorous acid; and other optional components.

The phosphinates cited above, e.g., U.S. Pat. Nos. 6,365,071 and 6,255,371, are said to be thermally stable, and to not decompose the polymers during processing, nor affect the process of preparing the polymeric composition. The phosphinates are not volatile under the customary conditions of preparation and processing of thermoplastic polymers. However, these materials are not necessarily suitable for use in all polymer systems and may create processing problems or lack the flame retardant effectiveness needed for certain polymers.

Phosphonic acid salts, particularly phosphonic acid metal salts, are reported to be thermally stable. However, as disclosed in US 2007/0029532, decomposition of such phosphonic acid salts is well known at temperatures encountered during processing of polyesters and polyamides, damaging the polymers in the process and providing only "brittle compositions which are unusable" as an engineering thermoplastic.

U.S. Pat. No. 5,053,148 also contains teachings about the thermal transformation of phosphonic acid salts, also referred to as phosphonate salts, namely that heating metal phosphonates or metal phosphonate precursors to temperatures of above 200° C., typically well above 200° C., causes the materials to form an intractable, insoluble foam. The foam can be used as an electrical and/or heat insulation material. U.S. Pat. No. 5,053,148 also discloses that forming this foam by heating metal phosphonates or metal phosphonate precursors in the presence of a thermoplastic, such as aromatic polyesters, polyethers, etc., will generate a porous polymer composition due to decomposition of the polymer caused by the thermal transformation of the phosphonates or phosphonate precursors. Neither US 2007/0029532 nor U.S. Pat. No. 5,053,148 contains any discussion of what the chemical makeup of the salt transformation products might be, nor is there any suggestion to first thermally transform the salt, and then incorporate that transformation product into a polymer composition.

U.S. Pat. Nos. 9,534,108; 9,745,449; 9,752,009; 9,752,011; 9,758,640; and 9,765,204 disclose that heating phosphonate salts, generally in the absence of other materials, at high enough temperature thermally transforms the phosphonate salts into a different, more thermally stable material exhibiting excellent flame retardant activity when incorporated into polymeric substrates. The thermally transformed materials do not degrade at high temperatures, nor do they cause degradation of a polymer, when processed in polymer compositions at elevated temperatures, e.g., 240° C., 250° C., 260° C., 270° C. or higher, which is a great advantage over previously known phosphonate salts, which exhibit flame retardant activity but often degrade the polymer during processing. The thermally transformed materials are described as comprising one or more compounds represented by empirical formula (IV) and complex dehydration products thereof:

wherein R is alkyl or aryl, M is a metal, q is a number of from 1 to 7, e.g., 1, 2 or 3, r is a number from 0 to 5, e.g., 0, 1 or 2, often 0 or 1, y is a number of from 1 to 7, e.g., from 1 to 4, and n is 1 or 2, provided that 2(q)+r=n(y). It is also disclosed that, as is common with inorganic coordination compounds, the formula (IV) is idealized and the product may include coordination polymers, complex salts, salts where certain atomic valences are shared, etc.

While the material of U.S. Pat. No. 9,745,449, etc., is an effective flame retardant that does not cause degradation of polymer properties during processing, it is formed according to the process therein generally as a solid mass requiring grinding or other such physical processing prior to incorporation into a polymer composition. Furthermore, results from the scale up of the processes exemplified in the art tend to be inconsistent, and reproducibility between runs, e.g., the conversion yield and physical properties, can be difficult to achieve.

Phosphorus acid salts, formula (VI), and derivatives thereof can be thermally converted under proper conditions into salts of pyrophosphorus acid, formula (V). U.S. Pat. No. 4,859,466 discloses that pyrophosphonic salts of formula (V) have microbicide activity and US Pub. Pat. Appl. 2016/0032076 discloses their use as flame retardants.

Pyrophosphonic salts can be prepared by heating phosphorus acid salts either on their own or in the presence of diphenylmethane.

Improvements in at least the preparation, handling, and batch reproducibility of the thermally transformed flame retardants of U.S. Pat. Nos. 9,534,108, 9,745,449, etc., are still needed.

SUMMARY OF THE INVENTION

The present disclosure provides an improved process for making thermally stable flame retardant materials, which exhibit <5%, e.g., <3% or <1%, weight loss in thermal gravimetric analysis (TGA) at temperatures above 350° C. and up to, e.g., 400° C., 450° C., or higher.

The process of the present disclosure improves upon several drawbacks of existing processes for thermally converting metal phosphonate salts into more thermally stable flame retardant materials. For example, the present process provides a flame retardant material with improved physical form and handling properties, while also improving reproducibility, especially on scale up. Other advantages will be apparent to the practitioner from this disclosure.

One embodiment of the present disclosure is a process which provides a flame retardant material in the form of a powder or small particles, the process comprising heating a mixture of i) a high boiling, water miscible, acid stable solvent, with a boiling point (bp) of over 200° C., 220° C., 240° C., or 260° C., e.g., a sulfone solvent, and ii) one or more phosphonic acid salts of formula (I):

(VI)

wherein R is H, an alkyl, aryl, alkylaryl or arylalkyl group, p is a number of from 2 to 7, e.g., from 2 to 4, e.g., 2, 3 or 4, M is a metal, y is a number of from 2 to 7, e.g., from 2 to 4, e.g., 2, 3 or 4, often 2 or 3, so that $M^{(+)y}$ is a metal cation where (+)y represents the charge formally assigned to the cation, at temperatures of 200° C. or higher, generally, 220° C. or higher, e.g., 250° C. or higher, e.g. a temperature in the range of from about 220° C. to about 400° C., or from about 240° C. to about 360° C., to produce the flame retardant material directly, i.e., without requiring or necessitating grinding, granulating, or the like, as a powder or small particles. It should be understood that producing the flame retardant material "directly" as a powder or small particles in accordance with the presently disclosed process permits workup of the reaction product, such as isolating the flame retardant product (e.g., separating the flame retardant product from remaining solvent), which may include, e.g., processing the reaction product by filtering, washing, drying, and the like.

Good results are obtained when the high boiling, water miscible, acid stable solvent is, e.g., a sulfone with a bp of over 200° C., e.g., about 220° C. or higher, about 240° C. or higher, about 260° C. or higher, or about 280° C. or higher. Non-limiting examples of such solvents include sulfolane, with a bp of 285° C., and dimethyl sulfone.

Typically, the high boiling, water miscible, acid stable solvent component i) is the majority component in the solvent/phosphonate salt mixture being heated, i.e., the high boiling, water miscible, acid stable solvent is 51 wt % or more of the solvent/phosphonate salt mixture, e.g., the solvent concentration may be 60 wt % or higher, 70 wt % or higher, 80 wt % or higher, 85 wt % or higher, 90 wt % or higher, or 95 wt % or higher. For example, in the mixture of i) high boiling, water miscible, acid stable solvent and ii) phosphonate salt, the high boiling, water miscible, acid stable solvent may be present in about 60 to 99 wt %, 65 to 98 wt %, or 70 to 98 wt %, based on the total weight of i) and ii).

The reaction to produce the flame retardant of the present disclosure gives off water as a byproduct and is often referred to as a dehydration reaction. The solvent according to the present disclosure, in addition to transferring even heat to the reaction and suspending the starting materials and products as they form, is also water miscible and it is believed that it may absorb water as it is generated during the reaction and/or aid in efficient mixing with phosphonate salts in aqueous solutions.

The present method, which directly (without grinding etc.) yields the thermally stable flame retardant as a powder or small particles, offers an important improvement over existing production methods, e.g., methods described in U.S. Pat. No. 9,745,449 etc., which, in contrast to the inventive process, produce the thermally stable flame retardant material as a hard solid mass by heating the phosphonate salt generally in the absence of other materials.

Another embodiment of the current disclosure provides the flame retardant material obtained from the above process, which is a powder or collection of small particles. The powder or collection of small particles may have a median particle size (d50) of, e.g., about 100 μm or less, such as about 80 μm or less, or about 60 μm or less, as measured by laser diffraction according to ISO 13320. For example, the powder or collection of small particles may have a median particle size (d50) of from about 1 μm to about 100 μm, from about 10 μm to about 90 μm, from about 20 μm to about 80 μm, or from about 20 μm to about 60 μm. The powder or collection of small particles is obtained from the reaction product, as described herein, without requiring grinding or similar such physical processing.

In another embodiment, a flame retardant polymer composition comprises:
  a) a thermoset or thermoplastic polymer, e.g., a thermoplastic polymer, and
  b) from 1% to 50%, by weight based on the total weight of the flame retardant polymer composition, of the flame retardant material above, and
  c) optionally other flame retardants or flame retardant synergists.

Another embodiment provides a method for preparing a flame retardant polymer composition, which method comprises heating one or more metal phosphonate salts of formula (I), in a high boiling, water miscible, acid stable solvent under conditions that chemically transform the phosphonates into the more thermally stable flame retardant material of the present disclosure as described above, and then incorporating the thus prepared thermally stable flame retardant into a polymer resin, e.g., by melt processing. For example, the flame retardant may be introduced into molten polymer by blending, extrusion, fiber or film formation etc.

In a further embodiment, a flame retardant material, which is in the form of a powder or small particles, comprises a compound or mixture of compounds of empirical formula (IV)

(IV)

wherein R is H, an alkyl, aryl, alkylaryl or arylalkyl group, q is a number of from 1 to 7, e.g., 1, 2 or 3, r is a number from 0 to 5, e.g., 0, 1 or 2, often 0 or 1, M is a metal, y is a number of from 2 to 7, e.g., from 2 to 4, e.g., 2, 3 or 4, often 2 or 3, so that $M^{(+)y}$ is a metal cation where (+)y represents the charge formally assigned to the cation, and n is 1 or 2, provided that 2(q)+r=n(y). The flame retardant material may have a median particle size (d50) of, e.g., about 100 μm or less, such as about 80 μm or less, or about 60 μm or less, as measured by laser diffraction according to ISO 13320. For example, the powder or collection of small particles may have a median particle size (d50) of from about 1 μm to about 100 μm, from about 10 μm to about 90 μm, from about 20 μm to about 80 μm, or from about 20 μm to about 60 μm. In some embodiments, the flame retardant material consists essentially of the compound or mixture of compounds of empirical formula (IV).

It has been found that metal phosphonate salts of formula I, can be consistently converted into more thermally stable flame retardant materials, with process flexibility, by heating the metal phosphonate salts in a high boiling, water miscible, acid stable solvent. The present method provides more consistency in the yields and quality of the flame retardant than previous methods. Further, the product of the present method is obtained directly as a powder, or fine particle solid, which requires no grinding, granulating, or other such physical processing before use, as opposed to the solid mass obtained using the process of the prior art.

The preceding summary is not intended to restrict in any way the scope of the claimed invention. In addition, it is to be understood that both the foregoing general description and the following detailed description are exemplary and explanatory only and are not restrictive of the invention, as claimed.

DESCRIPTION OF THE INVENTION

Unless otherwise specified, the word "a" or "an" in this application means "one or more than one".

In the present process, a mixture of
(i) a phosphonate salt of formula I, (I)

wherein R is H, an alkyl, aryl, alkylaryl or arylalkyl group, p is a number of from 2 to 7, e.g., from 2 to 4, e.g., 2, 3 or 4, M is a metal, y is a number of from 2 to 7, e.g., from 2 to 4, e.g., 2, 3 or 4, often 2 or 3, so that $M^{(+)y}$ is a metal cation where (+)y represents the charge formally assigned to the cation, and
(ii) a high boiling, water miscible, acid stable solvent, wherein the solvent is 51 to 99 wt % of the mixture, e.g., 60 to 99 wt %, 65 to 98 wt %, or 70 to 98 wt % of the mixture, based on the combined weight of the phosphonate salt of formula I and high boiling, water miscible, acid stable solvent, is heated to dehydration temperatures, typically over 200° C., such as 220° C. or higher (e.g., 250° C. or higher), e.g., a temperature in the range of from about 220° C. to about 400° C., or from about 240° C. to about 360° C., to provide the flame retardant of the present disclosure as a powder or small particles, generally as a flowable powder or flowable small particles.

In formula (I), $M^{(+)y}$ where y is 2 represents a di-cation such as $Mg^{++}$, $Ca^{++}$ or $Zn^{++}$ and the like, $M^{(+)y}$ where y is 3 represents a tri-cation such as $Al^{+++}$, etc. As is common with inorganic coordination compounds, the formulae are idealized and the starting materials and products may include coordination polymers or complex salts (e.g., salts where certain atomic valences are shared such as where a single oxygen anion is shared between two metal cations, etc.). Typically, the starting salt is charged balanced, that is, a compound of formula (I) wherein p=y, e.g., when $M^{(+)y}$ is $Al^{+++}$, p is 3, etc.

Phosphonate salts of formula (I), and methods of their preparation are known in the art, and some are known as flame retardants, e.g., tris-[methylphosphonic acid] aluminum salt. Phosphonate salts used as starting materials herein can be found as the starting materials used in U.S. Pat. Nos. 9,745,449 and 9,752,009 etc., for making flame retardants.

As opposed to the processes of the art, where the salts are heated generally in the absence of other materials, in the present disclosure the phosphonate salt is subjected to dehydration temperatures while mixed with a high boiling, water miscible, acid stable solvent as dehydration media, as described herein. The dehydration reaction generates water, which water will be compatible with the solvent of the instant disclosure, which may help promote a smooth reaction. The water miscibility and acid stability of the solvent also likely helps facilitate mixing when a phosphonate salt is added as a solution in an aqueous solvent.

The solvent used in the dehydration stage of the present process should be stable under dehydration reaction conditions. The dehydration reaction occurs at high temperature, e.g., reaction temperatures often exceed 220° C., 230° C., 240° C. or 250° C., for example, temperatures of from about 220° C. to about 400° C., or from about 240° C. to about 360° C., e.g., 240 to 290 or 300° C.

The water miscible, acid stable solvent of the present disclosure has a high boiling point, e.g., a bp of over 200° C., such as about 220° C. or higher, about 240° C. or higher, about 260° C. or higher, about 270° C. or higher, or about 280° C. or higher, e.g., from about 220° C. to about 360° C. or from about 230° C. to about 350° C. Exemplary solvents meeting all three criteria—high boiling point, acid stability, and water miscibility—include sulfones. In some embodiments, the high boiling, acid stable, water miscible solvent comprises a sulfone of the formula $R_1R_2SO_2$, wherein $R_1$ and $R_2$ are independently chosen from $C_{1-6}$ hydrocarbon groups, e.g., $C_{1-3}$ hydrocarbon groups, or $R_1$ and $R_2$ taken together with S form a ring having 2, 3, 4, or 5 carbon atoms, which ring may be unsubstituted or $C_{1-3}$ alkyl-substituted. In some embodiments, $R_1$ and $R_2$ taken together with S form a di-, tri-, tetra-, or penta-methylene ring. In some embodiments, $R_1$ and $R_2$ are independently chosen from $C_{1-6}$ alkyl. In some embodiments, $R_1$ or $R_2$ is $C_{1-6}$ alkyl and the other is $C_{1-3}$ alkyl. In some embodiments, $R_1$ and $R_2$ are independently chosen from $C_{1-3}$ alkyl. The alkyl groups may be branched or straight-chained. In some embodiments, $R_1$ and $R_2$ are both methyl, both ethyl, or both propyl. In other embodiments, $R_1$ or $R_2$ is methyl and the other is ethyl or propyl. In other embodiments, $R_1$ or $R_2$ is ethyl and the other is propyl. In some embodiments, the sulfone is sulfolane.

According to the present disclosure, a phosphonic acid salt of formula (I) is combined with a high boiling, acid stable, water miscible solvent and heated to dehydration temperatures as described herein to produce the flame retardant material of the present disclosure in the form of a powder or small particles. Generally, the phosphonic acid salt is mixed with the high boiling, acid stable, water miscible solvent under conditions sufficient to form a suspension or slurry, such as a homogenous suspension or slurry. For example, in some embodiments, the phosphonic acid salt (i.e., a phosphonate salt of formula (I)) is mixed or combined with the high boiling, acid stable, water miscible solvent at elevated temperature to form a suspension or slurry before subjecting the mixture to dehydration temperatures as described herein. Heating can, but need not, be ramped up gradually over time to one or more of the elevated temperatures and/or occur under vacuum conditions, such as under mild vacuum. The elevated temperature may depend on the melting point of the high boiling, acid stable, water miscible solvent. For example, some useful high boiling, acid stable, water miscible solvents may be solid at room temperature but convert to liquid solvent at elevated temperature. Generally, the elevated temperatures are above room temperature, e.g., greater than 25, 30, 35, 40, 45, or 50° C., such as about 30° C. to about 160° C., about 60° C. to about 160° C., about 40° C. to about 130° C., about 80° C. to about 120° C., about 40° C. to about 100° C., or about 50° C. to about 90° C. In some embodiments, the elevated temperature is below 100° C., such as any of the above disclosed temperature ranges, but below 100° C. The mixture may be heated and kept at more than one elevated temperature. For instance, the mixture may be heated to an elevated temperature for a time and subsequently heated or cooled to one or more other elevated temperatures. For example, the mixture may be heated to an elevated temperature ranging from about 60° C. to about 140° C., such as about 80° C. to about 120° C., for a time, and subsequently heated to an elevated temperature ranging from about 140° C. to about 160° C. for additional time.

Mixing the phosphonic acid salt with the high boiling, acid stable, water miscible solvent, such as at one or more elevated temperatures, optionally under vacuum conditions, occurs over time, e.g., about 5 minutes or longer, about 10 minutes or longer, about 30 minutes or longer, about 1 hour or longer, about 3 hours or longer, about 4 hours or longer, about 6 hours or longer, about 8 hours or longer, about 12 hours or longer, about 24 hours or longer, about 36 hours or longer, or about 48 hour or longer, or any range therebetween. For example, the amount of time may be from about 30 minutes to about 72 hours, from about 1 hour to about 48 hours, or from about 2 hours to about 36 hours. During this time, undesired volatiles may be removed, and an amount of water may be removed or distilled out of the mixture. Generally, the resulting mixture forms a suspension or slurry, such as a homogenous suspension or slurry. It will be apparent to the practitioner that the conditions such as temperature, pressure (e.g., vacuum conditions), stir speed, time, etc. for mixing the phosphonic acid salt with the high boiling, acid stable, water miscible solvent are interrelated and can be adjusted to effect the formation of a suspension or slurry, such as achieving a homogenous suspension or slurry.

In some embodiments, after the formation of a suspension or slurry (e.g., a slurry or suspension may appear after, e.g., about 10 minutes, about 30 minutes, about 1 hour, about 2 hours, about 4 hours, or about 6 hours of mixing the phosphonic acid salt and high boiling, acid stable, water miscible solvent at elevated temperature), the suspension or slurry is stirred for a time, such as at elevated temperature as described herein. In some embodiments, the elevated temperature at which the suspension or slurry is stirred is reduced from the elevated temperature(s) at which the mixture was heated to form the suspension or slurry. In some embodiments, the suspension or slurry is stirred at elevated temperature ranging from about 30° C. to about 95° C. or from about 40° C. to about 80° C. In some embodiments, the suspension or slurry is stirred for about 1 minute or longer, about 10 minutes or longer, about 30 minutes or longer, about 1 hour or longer, about 4 hours or longer, about 12 hours or longer, about 24 hours or longer, about 36 hours or longer, or about 48 hours or longer, or any range therebetween.

The phosphonic acid salt may be in a liquid medium or in solid form (e.g., powder) at the time it is combined with the high boiling, acid stable, water miscible solvent. For example, in some embodiments, the phosphonic acid salt is in an aqueous liquid (e.g., dissolved or partially dissolved in an aqueous liquid). For example, an aqueous solution of a salt of formula I may be mixed with the high boiling, acid stable, water miscible solvent.

In some embodiments, it can be desirable to add aqueous solvent to the mixture of the phosphonic acid salt and the high boiling, acid stable, water miscible solvent, e.g., to avoid gelling during the formation of the suspension or slurry or, if gel formation occurs, to disrupt the gelation. It is also believed that there may be a greater likelihood of gelation with the use of certain metal-containing starting materials that supply the metal cation for the salt of formula (I) (i.e., certain metal compound precursors to the phosphonic acid salt). The addition of aqueous solvent may be repeated if necessary/desired during the mixing process.

Additionally, in some embodiments, it can be desirable to add a seeding material (optionally in addition to the aqueous solvent or without the aqueous solvent) to the mixture of the phosphonic acid salt and the high boiling, acid stable, water miscible solvent to speed up the formation of a suspension or slurry, e.g., a homogenous slurry. Reducing the time for slurry formation may also help reduce the formation of a gel as discussed above. The addition of seeding material (optionally in addition to or without the aqueous solvent) may be repeated if necessary/desired during the mixing process. In some embodiments, the seeding material comprises an inert filler, which may be any material that is inert to the dehydration reaction and of a desirable particle size. Silica, alumina, talc, and titanium dioxide are non-limiting examples of suitable inert fillers. In some embodiments, the seeding material comprises a flame retardant material (and optionally an inert filler) produced according to the process of the present disclosure, such as a flame retardant material of formula (IV) as described herein, and/or a flame retardant material according to U.S. Pat. No. 9,745,449 and the like. The seeding material may have a median particle size (d50) of, e.g., about 100 µm or less, such as about 80 µm or less, or about 60 µm or less, as measured by laser diffraction according to ISO 13320. For example, the seeding material may have a median particle size (d50) of from about 1 µm to about 100 µm, from about 10 µm to about 90 µm, from about 20 µm to about 80 or from about 20 µm to about 60 µm.

In one embodiment, an aqueous solution of tris-[methylphosphonic acid] aluminum salt, prepared from an aluminum chloride hexahydrate starting material, and sulfolane as a high boiling, water miscible, acid stable solvent are mixed at elevated temperature ranging from about 80° C. to about 140° C., such as about 100° C. to about 125° C., optionally under mild vacuum, and a seeding material is added to the mixture. In some embodiments, aqueous solvent is also added to the mixture, e.g., if the mixture or parts thereof form a gel-like consistency. In some embodiments, after, e.g., about 2-6 hours of heating, the mixture is heated to a further elevated temperature ranging from about 100° C. to about 160° C., such as about 120° C. to about 160° C., or about 140° C. to about 160° C. In some embodiments, after formation of a suspension or slurry, e.g., after about 1-2 hours, the temperature is subsequently reduced to a lower elevated temperature for stirring the suspension or slurry as described herein. The resulting mixture is then heated to dehydration temperatures (e.g., about 240° C. to about 360° C.) for an amount of time (e.g., about 2 hours to about 6 hours), as described herein.

In another embodiment, an aqueous solution of tris-[methylphosphonic acid] aluminum salt, prepared from aluminum isopropoxide starting material, and sulfolane as a high boiling, water miscible, acid stable solvent are mixed at elevated temperature ranging from about 60° C. to about 100° C., such as about 80° C. to about 95° C., optionally under mild vacuum. In some embodiments, the aqueous solution of the salt and the sulfolane are mixed for an amount of time ranging from about 2 hours to about 6 hours at the elevated temperature. After formation of a suspension or slurry, the resulting mixture is heated to dehydration temperatures (e.g., about 240° C. to about 360° C.) for an amount of time (e.g., about 2 hours to about 6 hours), as described herein.

Phosphonic acid salts of formula (I) are known and various methods for their preparation are described in the art. For example, the phosphonic acid salts of formula (I) can be selected from salts disclosed in US 2006/0138391, US 2015/0031805, and elsewhere in the art. In some embodiments, the salts of formula (I) comprise compounds wherein R is H, $C_{1-12}$ alkyl, $C_{6-10}$ aryl, $C_{7-18}$ alkylaryl, or $C_{7-18}$ arylalkyl group, wherein said groups are further substituted as described in US 2006/0138391, but often R is unsubstituted $C_{1-12}$ alkyl, $C_{6-10}$ aryl, $C_{7-18}$ alkylaryl, or $C_{7-18}$ arylalkyl. For example, R may be substituted or unsubstituted, often unsubstituted, $C_{1-6}$ alkyl, $C_6$ aryl, $C_{7-10}$ alkylaryl, or $C_{7-12}$ arylalkyl, e.g., $C_{1-4}$ alkyl.

The present disclosure is not limited to any particular metal cation $M^{(+)y}$. Examples of suitable metals include Mg, Ca, Ba, Zn, Zr, Ge, B, Al, Si, Ti, Cu, Fe, Sn, and Sb. In some embodiments, M is chosen from Mg, Ca, Ba, Zn, Zr, B, Al, Si, Ti, Fe, Sn and Sb. In some embodiments, M is chosen from Mg, Ca, Ba, Zn, Zr, B, Al, Fe, Sn and Sb. In some embodiments, M is chosen from Al, Fe, Zn and Ca.

R as alkyl is a straight or branched chain alkyl group having the specified number of carbons and includes e.g., unbranched alkyl such as methyl, ethyl, propyl, butyl, pentyl, hexyl, heptyl, octyl, nonyl, decyl, undecyl, dodecyl, and branched alkyl such as isopropyl, isobutyl, sec-butyl, t-butyl, ethyl hexyl, t-octyl and the like. For example, R as alkyl may be methyl, ethyl, propyl, isopropyl, butyl, isobutyl, sec-buty, t-butyl, often R is methyl, ethyl, propyl or isopropyl, for example methyl.

Often, when R is aryl it is phenyl or naphthyl, for example, phenyl. Examples of R as alkylaryl include phenyl substituted by one or more alkyl groups, for example groups selected from methyl, ethyl, propyl, isopropyl, butyl, isobutyl, sec-buty, t-butyl, and the like. Examples of R as arylalkyl, include for example, benzyl, phenethyl, styryl, cumyl, phenpropyl and the like.

In some embodiments, R is H, methyl, ethyl, propyl, isopropyl, phenyl or benzyl, e.g., methyl, ethyl, propyl, isopropyl or phenyl, such as, methyl, ethyl, propyl or isopropyl, e.g., methyl.

In some embodiments, the phosphonate salt is a compound of formula (I) wherein R is H, methyl, ethyl, propyl, isopropyl, benzyl or phenyl, M is Al, Fe, Zn or Ca and p is 2 or 3. In some embodiments, R is H, methyl, ethyl, propyl or isopropyl, p=3 and M is Al or Fe; in other embodiments R is H, methyl, ethyl, propyl or isopropyl, p=2 and M is Zn or Ca, e.g., Ca.

As described above, more than one phosphonic acid salt of formula (I) may be used with different R and/or M. In some embodiments, at least one R is selected from H, methyl, ethyl, propyl, isopropyl, butyl, isobutyl, sec-butyl, t-butyl and phenyl, and at least one M is selected from Al, Fe, Zn and Ca. In some embodiments, each R is selected from H, methyl, ethyl, propyl, isopropyl, butyl, isobutyl, sec-butyl, t-butyl and phenyl, and each M is selected from Al, Fe, Zn and Ca.

The amount of time it takes to convert the phosphonic acid salts of formula (I) to the flame retardant of the invention will vary depending on a variety of factors, including, e.g., the chemical structure of the starting phosphonic acid salt, temperature of the reaction, etc.

Good conversion of the phosphonic acid salt of formula (I) to the flame retardant material of the present disclosure is obtained by heating the mixture of the salt and high boiling, water miscible, acid stable solvent at the dehydration temperatures described herein, typically temperatures of 200° C. or higher, generally, 220° C. or higher, e.g., 250° C. or higher, e.g. a temperature in the range of from about 220° C. to about 400° C., or from about 240° C. to about 360° C., for a time of 20 hours or less, such as 12 hours or less. Generally, the mixture of the phosphonic acid salt of formula (I) and the high boiling, water miscible, acid stable solvent is heated at temperatures of from about 200° C. (e.g., from about 220° C.) to about 400° C. for about 1 minute to about 20 hours, such as for about 30 minutes to about 12 hours, for about 1 hour to about 8 hours, or for about 2 hours to about 6 hours. In one example, the mixture is heated at from about 220° C. to about 400° C. for about 1 hour to about 12 hours or for about 1 hour to about 8 hours. In another example, the mixture is heated at from about 240° C. to about 360° C. for about 1 hour to about 6 hours or for about 2 hours to about 6 hours. In some circumstances, such as at higher temperatures (e.g., about 250° C. to about 400° C. or temperatures above 400° C.) and/or when the reaction vessel or environment makes heat transfer to the starting material highly efficient, heating may occur on the order of minutes or seconds, for example, less than 1 hour, less than 30 minutes, less than 15 minutes, less than 6 minutes, less than 1 minute, or less than 30 seconds.

While not wishing to be bound by theory, it is believed that the flame retardant material obtained by the method of the present disclosure comprises a compound or mixture of compounds represented by empirical formula (IV):

(IV)

wherein R is H, an alkyl, aryl, alkylaryl or arylalkyl as above, M is a metal as above, q is a number of from 1 to 7, e.g., 1, 2 or 3, r is a number from 0 to 5, e.g., 0, 1 or 2, often 0 or 1, y is a number of from 2 to 7, e.g., from 2 to 4, and n is 1 or 2, provided that 2(q)+r=n(y). Naturally, the identities of the groups R and M well reflect the groups employed as R and M in the salt of formula (I) used as a starting material. As is common with inorganic coordination compounds as mentioned above, the formula (IV) is empirical and includes coordination polymers and complex salts (e.g., salts where certain atomic valences are shared).

The flame retardant material comprising a compound or mixture of compounds represented by empirical formula (IV) is produced in the form of a powder or small particles without requiring grinding, granulating, or other such physical processing. Such flame retardant material generally has a median particle size (d50) of about 100 μm or less, such as about 80 μm or less, or about 60 μm or less, as measured by laser diffraction according to ISO 13320. For example, the powder or small particles may have a median particle size (d50) of from about 1 μm to about 100 μm, from about 10 μm to about 90 μm, from about 20 μm to about 80 μm, or from about 20 μm to about 60 μm.

As stated above, even when starting from a single compound of formula (I) wherein one R group and one metal is present, a mixture of compounds often forms according to empirical formula (IV) described herein. In some embodiments, the flame retardant material is prepared from a mixture of phosphonate salts, wherein multiple values for R and/or M are present, producing a mixture of compounds according to empirical formula (IV) comprising the multiple R groups and/or metals. In some embodiments, the flame retardant material of the present disclosure is prepared by separately obtaining two or more flame retardant material according to the methods described herein and mixing the two or more flame retardant materials together such that the resulting flame retardant comprises a mixture of compounds according to empirical formula (IV) having multiple values for R and/or M. U.S. Pat. No. 9,752,011 is incorporated herein by reference for its disclosure of techniques for preparing mixtures of phosphonate salts, wherein different R groups and/or metals are present.

The flame retardant of the present disclosure may be used with a variety of other flame retardants, synergists or flame retardant adjuvants as known in the art. For example, the flame retardant may be formulated with one or more materials selected from: carbon black, graphite, carbon nanotubes, siloxanes, polysiloxanes; polyphenylene ether (PPE), phosphine oxides and polyphosphine oxides, e.g., benzylic phosphine oxides, poly benzylic phosphine oxides and the like;

melamine, melamine derivatives and melamine condensation products, melamine salts such as, but not limited to, melamine cyanurate, melamine borate, melamine phosphates, melamine metal phosphates, melam, melem, melon and the like;

inorganic compounds including clays, metal salts such as hydroxides, oxides, oxide hydrates, borates, carbonates, sulfates, phosphates, phosphites, hypophosphites, silicates, mixed metal salts, etc., e.g., talc and other magnesium silicates, calcium silicate, aluminosilicate, aluminosilicate as hollow tubes (DRAGONITE), calcium carbonate, magnesium carbonate, barium sulfate, calcium sulfate, HALLOYSITE or boron phosphate, calcium molybdate, exfoliated vermiculite, zinc stannate, zinc hydroxystannate, zinc sulfide and zinc borate, zinc molybdate (KEMGARD 911A/B), zinc phosphate (KEMGARD 981), magnesium oxide or hydroxide, aluminum oxide, aluminum oxide hydroxide (Boehmite), aluminum trihydrate, silica, tin oxide, antimony oxide (III and V) and oxide hydrate, titanium oxide, and zinc oxide or oxide hydrate, zirconium oxide and/or zirconium hydroxide and the like.

Unless otherwise specified, in the context of the present application, the term "phosphate" when used as a component in a "phosphate salt", such as in metal phosphate, melamine phosphate, melamine metal phosphate, etc., refers to a phosphate, hydrogen phosphate, dihydrogen phosphate, pyrophosphate, polyphosphate, or a phosphoric acid condensation products anion or polyanion.

Likewise, unless otherwise specified, in the context of the present application, the term "phosphite" when used as a component in a "phosphite salt", such as in metal phosphite, etc., refers to a phosphite or hydrogen phosphite.

The flame retardant of the present disclosure may also be formulated with other flame retardants such as halogenated flame retardants, alkyl or aryl phosphine oxide flame retardants, alkyl or aryl phosphate flame retardants, alkyl or aryl phosphonates, alkyl or aryl phosphinates, and salts of alkyl or aryl phosphinic acid. In some embodiments, the flame retardant comprises a mixture of the flame retardant material according to the instant disclosure and a phosphinic salt of formula (II), (e.g., an aluminum tris(dialkylphosphinate), (II)

$R_1$ and $R_2$ each independently may be a group according to R as described herein, M is a metal as described herein (e.g., Al or Ca), and n is a number of from 2 to 7, e.g., from 2 to 4, often 2 or 3.

Thus, in many embodiments the flame retardant polymer composition according to the present disclosure comprises (a) a polymer, (b) the flame retardant of the present disclosure, and (c) one or more additional flame retardants, and/or one or more synergists or flame retardant adjuvants.

For example, in some embodiments the flame retardant polymer composition comprises one or more additional flame retardants, e.g., halogenated flame retardants, phosphine oxide flame retardants, alkyl or aryl phosphonates, or salts of alkyl or aryl phosphinates, e.g., an aluminum tris(dialkylphosphinate) such as aluminum tris(diethylphosphinate).

In some embodiments the flame retardant polymer composition comprises one or more synergists or flame retardant adjuvants, e.g., melamine, melamine derivatives and melamine condensation products, melamine salts, phosphine oxides and polyphosphine oxides, metal salts such as hydroxides, oxides, oxide hydrates, borates, phosphates, phosphites, silicates and the like, e.g. aluminum hydrogen phosphite, melem or a melamine metal phosphate, e.g., a melamine metal phosphate wherein the metal comprises aluminum, magnesium or zinc. In particular embodiments the one or more additional flame retardant, synergist or flame retardant adjuvant comprises an aluminum tris(dialkylphosphinate), aluminum hydrogen phosphite, methylenediphenylphosphine oxide-substituted polyaryl ether, xylylenebis(diphenylphosphine oxide), 4,4'-bis(diphenylphosphinylmethyl)-1,1'-biphenyl, ethylene bis-1,2-bis-(9,10-dihydro-9-oxy-10-phosphaphenanthrene-10-oxide)ethane, melem, melam, melon, or dimelamine zinc pyrophosphate.

Certain embodiments provide a halogen free polymer composition. In such embodiments, halogen containing flame retardants or synergists would be excluded as much as possible.

The flame retardant material of the present disclosure may be combined, e.g., with an additional flame retardant, synergist or adjuvant in a range of 100:1 to 1:100 by weight of the inventive flame retardant to the total weight of additional flame retardant, synergist and/or adjuvant. In some embodiments, the flame retardant material of the present disclosure is present in a range of 10:1 to 1:10 by weight of the inventive flame retardant to the total weight of additional flame retardant, synergist and/or adjuvant, for example, weight ratios ranging from 7:1 to 1:7, 6:1 to 1:6, 4:1 to 1:4, 3:1 to 1:3 and 2:1 to 1:2. The inventive flame retardant is often the majority component in such a combination, e.g., a 10:1 to 1.2:1 ratio or a 7:1 to 2:1 ratio by weight of the inventive flame retardant material to the total weight of additional flame retardant, synergist and/or adjuvant, but the inventive material can also be the minor component of the mixture, e.g., a 1:10 to 1:1.2 ratio or a 1:7 to 1:2 ratio.

The thermally stable flame retardant of the invention can be compounded into thermoplastic polymers at high temperatures, such as high temperature polyamides and polyterephthalate esters, without decomposing or negatively impacting the physical properties of the polymer, and the flame retardant activity is excellent. The flame retardant of the invention may be used in other polymers, with other synergists and with conventional polymer additives.

The polymer of the flame retardant composition of the present disclosure may be any polymer known in the art, such as polyolefin homopolymers and copolymers, rubbers, polyesters including polyalkylene terephthalates, epoxy resins, polyurethanes, polysulfones, polyimides, polyphenylene ethers, styrenic polymers and copolymers, polycarbonates, acrylic polymers, polyamides, polyacetals, and biodegradable polymers. Mixtures of different polymers, such as polyphenylene ether/styrenic resin blends, polyvinyl chloride/acrylonitrile butadiene styrene (ABS) or other impact modified polymers, such as methacrylonitrile and α-methylstyrene containing ABS, and polyester/ABS or polycarbonate/ABS and polyester or polystyrene plus some other impact modifier may also be used. Such polymers are available commercially or made by means well known in the art.

The flame retardant of the present disclosure is particularly useful in thermoplastic polymers that are processed and/or used at high temperatures, for example, styrenic polymers including high impact polystyrene (HIPS), polyolefins, polyesters, polycarbonates, polyamides, polyurethanes, polyphenylene ethers and the like.

For example, the polymer may be a polyester-series resin, a styrenic resin, a polyamide-series resin, a polycarbonate-series resin, a polyphenylene oxide-series resin, a vinyl-series resin, an olefinic resin, an acrylic resin, epoxy resin, or a polyurethane. The polymer can be a thermoplastic or a thermoset resin and may be reinforced, e.g., glass reinforced. More than one polymer resin may be present. In particular embodiments the polymer is an engineering polymer, e.g., a thermoplastic or reinforced thermoplastic polymer, e.g., glass reinforced thermoplastic polymer, such as an optionally glass filled polyester, epoxy resin or polyamide, for example, a glass-filled polyester such as a glass filled polyalkylene terephthalate, or a glass filled polyamide.

Polyester-series resins include homopolyesters and copolyesters obtained by, for example, polycondensation of a dicarboxylic acid component and a diol component, and polycondensation of a hydroxycarboxylic acid or a lactone component, for example, aromatic saturated polyester-series resin, such as polybutylene terephthalate or polyethylene terephthalate.

Polyamide (PA)-series resins include polyamides derived from a diamine and a dicarboxylic acid; polyamides obtained from an aminocarboxylic acid, if necessary in combination with a diamine and/or a dicarboxylic acid; and polyamides derived from a lactam, if necessary in combination with a diamine and/or a dicarboxylic acid. The polyamide also includes a copolyamide derived from at least two different kinds of polyamide constituent components. Examples of polyamide-series resins include aliphatic polyamides such as PA 46, PA 6, PA 66, PA 610, PA 612, PA 11 and PA 12, polyamides obtained from an aromatic dicarboxylic acid, e.g., terephthalic acid and/or isophthalic acid, and an aliphatic diamine, e.g., hexamethylenediamine or nonamethylenediamine, and polyamides obtained from both aromatic and aliphatic dicarboxylic acids, e.g., both terephthalic acid and adipic acid, and an aliphatic diamine, e.g., hexamethylenediamine, and others. These polyamides may be used singly or in combination. In some embodiments, the polymer comprises a polyphthalamide.

Polyamides with melting points of at least 280° C. are used extensively for producing molding compositions which make possible the production of molded articles, e.g. for the electrical and electronics industry, with excellent dimensional stability at high temperatures and with very good flame-retardant properties. Molding compositions of this type are demanded for example in the electronics industry for producing components which are mounted on printed circuit boards according to the so-called surface mounting technology, SMT. In this application, these components must withstand temperatures of up to 270° C. for short periods of time without dimensional change.

Such high temperature polyamides include certain polyamides produced from alkyl diamines and diacids as polyamide 4,6, however many high temperature polyamides are aromatic and semi-aromatic polyamides, i.e., homopolymers, copolymers, terpolymers, or higher polymers that are derived from monomers containing aromatic groups. A single aromatic or semi-aromatic polyamide may be employed or blends of aromatic and/or semi-aromatic polyamides are used. It is also possible that the preceding polyamide and polyamide blends are blended with other polymers, including aliphatic polyamides.

Examples of these high temperatures aromatic or semi-aromatic polyamides include polyamide 4T, poly(m-xylylene adipamide) (polyamide MXD,6), poly(dodecamethylene terephthalamide) (polyamide 12, T), poly (decamethylene terephthalamide) (polyamide 10, T), poly (nonamethylene terephthalamide) (polyamide 9, T), hexamethylene adipamide/hexamethylene terephthalamide copolyamide (polyamide 6, T/6,6), hexamethylene terephthalamide/2-methylpentamethylene terephthalamide copolyamide (polyamide 6, T/D,T); hexamethylene adipamide/ hexamethylene terephthalamide/hexamethylene isophthalamide copolyamide (polyamide 6,6/6, T/6, 1); poly (caprolactam-hexamethylene terephthalamide) (polyamide 6/6, T); hexamethylene terephthalamide/hexamethylene isophthalamide (6, T/6, 1) copolymer; and the like.

Thus, certain embodiments of the present disclosure are to compositions comprising a polyamide that melts at high temperatures, e.g., 280° C. or higher, 300° C., or higher, in some embodiments 320° C. or higher, e.g. from 280 to 340° C., such as polyamide 4,6 and the aromatic and semi-aromatic polyamide described above, articles comprising high temperature polyamides and the flame retardant material of the present disclosure, methods for preparing the compositions and methods for shaping the articles.

As described herein, in many embodiments, a flame retardant polymer composition comprises (a) a polymer, (b) a flame retardant of the present disclosure, and (c) one or more additional flame retardants, and/or one or more synergists or flame retardant adjuvants. Thus, while the flame retardant (b) alone exhibits excellent activity in polymer systems, it may be used in combination with (c) one or more compounds chosen from other flame retardants, synergists and adjuvants. Exemplary compounds (c) include halogenated flame retardants, alkyl or aryl phosphine oxides, alkyl or aryl polyphosphine oxides, alkyl or aryl phosphates, alkyl or aryl phosphonates, alkyl or aryl phosphinates, salts of alkyl or aryl phosphinic acid, carbon black, graphite, carbon nanotubes, siloxanes, polysiloxanes, polyphenylene ether, melamine, melamine derivatives, melamine condensation products, melamine salts, metal hydroxides, metal oxides, metal oxide hydrates, metal borates, metal carbonates, metal sulfates, metal phosphates, metal phosphites, metal hypophosphites, metal silicates, and mixed metal salts. For example, the one or more compounds (c) may be chosen from aluminum tris(dialkylphosphinate), aluminum hydrogen phosphite, benzylic phosphine oxides, poly benzylic phosphine oxides, melam, melem, melon, melamine phosphates, melamine metal phosphates, melamine cyanurate, melamine borate, talc, clays, calcium silicate, aluminosilicate, aluminosilicate as hollow tubes, calcium carbonate, magnesium carbonate, barium sulfate, calcium sulfate, boron phosphate, calcium molybdate, exfoliated vermiculite, zinc stannate, zinc hydroxystannate, zinc sulfide, zinc borate, zinc molybdate, zinc phosphate, magnesium oxide, magnesium hydroxide, aluminum oxide, aluminum oxide hydroxide, aluminum trihydrate, silica, tin oxide, antimony oxide (III and V), antimony (III and V) oxide hydrate, titanium oxide, zinc oxide, zinc oxide hydrate, zirconium oxide, and zirconium hydroxide. For example, the one or more compounds (c) may be chosen from aluminum tris (dimethylphosphinate), aluminum tris(diethylphosphinate), aluminum tris(dipropylphosphinate), aluminum tris (dibutylphosphinate), methylene-diphenylphosphine oxide-substituted polyaryl ether, xylylenebis(diphenylphosphine oxide), 1,2-bis-(9,10-dihydro-9-oxy-10-phosphaphenanthrene-10-oxide)ethane, 4,4'-bis(diphenylphosphinylmethyl)-1,1'-biphenyl, melam, melem, melon, and dimelamine zinc pyrophosphate.

In some embodiments, the flame retardant polymer composition comprises one or more compounds chosen from hydrotalcite clays, metal borates, metal oxides, and metal hydroxides, such as metal borates, metal oxides, or metal hydroxides wherein the metal is zinc or calcium.

The concentration of the inventive flame retardant in the polymer composition is of course dependent on the exact chemical composition of the flame retardant, the polymer and other components found in the final polymer composition. For example, when used as the sole flame retarding component of a polymer formulation the inventive flame retardant may be present in a concentration of from 1 to 50%, e.g., 1 to 30%, by weight of the total weight of the final composition. Typically, when used as the sole flame retardant there will be at least 2% of the inventive material present, for example 3% or more, 5% or more, 10% or more, 15% or more, 20% or more or 25% or more. In many embodiments, the inventive flame retardant is present in amounts up to 45%, while in other embodiments, the amount of inventive flame retardant is 40% of the polymer composition or less, e.g., 35% or less.

When used in combination with other flame retardants or flame retardant synergists, less of the inventive material may be needed.

Any known compounding techniques may be used to prepare the flame retardant polymer composition of the present disclosure, for example, the flame retardant may be introduced into molten polymer by blending, extrusion, fiber or film formation etc. In some cases the flame retardant is introduced into the polymer at the time of polymer formation or curing, for example, the flame retardant may be added to a polyurethane prepolymer prior to crosslinking or it may be added to a polyamine or alkyl-polycarboxyl compound prior to polyamide formation or to an epoxy mixture prior to cure.

The flame retardant polymer composition will often contain one or more of the common stabilizers or other additives frequently encountered in the art such as phenolic antioxidants, hindered amine light stabilizers (HALS), the ultraviolet light absorbers, phosphites, phosphonites, alkaline metal salts of fatty acids, hydrotalcites, metal oxides, borates, epoxidized soybean oils, the hydroxylamines, the tertiary amine oxides, lactones, thermal reaction products of tertiary amine oxides, thiosynergists, basic co-stabilizers, for example, melamine, melem etc., polyvinylpyrrolidone, dicyandiamide, triallyl cyanurate, urea derivatives, hydrazine derivatives, amines, polyamides, polyurethanes, hydrotalcites, alkali metal salts and alkaline earth metal salts of higher fatty acids, for example, Ca stearate, calcium stearoyl lactate, calcium lactate, Zn stearate, Zn octoate, Mg stearate, Na ricinoleate and K palmitate, antimony pyrocatecholate or zinc pyrocatecholate, nucleating agents, clarifying agents, etc.

Other additives may also be present, for example, plasticizers, lubricants, emulsifiers, pigments, dyes, optical brighteners, other flame proofing agents, anti-static agents, blowing agents, anti-drip agents, e.g., PTFE, and the like.

Optionally the polymer may include fillers and reinforcing agents, for example, calcium carbonate, silicates, glass fibers, talc, kaolin, mica, barium sulfate, metal oxides and hydroxides, carbon black and graphite. Such fillers and reinforcing agents may often be present at relatively high concentrations, including formulations where the filler or reinforcement is present in concentrations of over 50 wt % based on the weight of the final composition. More typically, fillers and reinforcing agents are present from about 5 to about 50 wt %, e.g., about 10 to about 40 wt % or about 15 to about 30 wt % based on the weight of the total polymer composition.

In some embodiments, the polymer compositions of the present disclosure may be formulated with one or more materials selected from carbon black, graphite, carbon nanotubes, siloxanes, polysiloxanes, talc, calcium carbonate, magnesium carbonate, barium sulfate, calcium sulfate, calcium silicate, magnesium silicate, aluminosilicate hollow tubes (Dragonite), Halloysite, boron phosphate, calcium molybdate, exfoliated vermiculite, zinc stannate, zinc hydroxystannate, zinc sulfide, zinc borate, zinc molybdate (Kemgard 911A/B), zinc phosphate (Kemgard 981) and the like;

hydroxides, oxides, and oxide hydrates of group 2, 4, 12, 13, 14, 15 (semi)metals, e.g., magnesium oxide or hydroxide, aluminum oxide, aluminum oxide hydroxide (Boehmite), aluminum trihydrate, silica, silicates, tin oxide, antimony oxide (III and V) and oxide hydrate, titanium oxide, and zinc oxide or oxide hydrate, zirconium oxide and/or zirconium hydroxide and the like; melamine and urea based resins such as melamine cyanurate, melamine borate, melamine polyphosphate, melamine pyrophosphate, polyphenylene ether (PPE) and the like; and clays, including e.g., hydrotalcite, boehmite, kaolin, mica, montmorillonite, wollastonite, nanoclays or organically modified nanoclays and the like.

Further non-limiting disclosure is provided in the Examples that follow.

EXAMPLES

Example 1

An aqueous solution containing 400 g tris-[methylphosphonic acid] aluminum salt, prepared from aluminum trichloride hexahydrate and methylphosphonic acid (MPA), was added to a reaction flask along with 2.5 kg sulfolane. Under mild vacuum the reaction mixture was stirred, and heating was applied to gradually raise the temperature. Water was removed as the temperature rose.

When about 400 mL water was distilled out of the reaction mixture, the pot temperature was 95° C., and a gel like material deposited on the wall of the reaction vessel. About 0.1 gram of seeding material having a median particle size (d50) of less than 100 μm was added along with 200 mL water and the gel like material disappeared from the wall. Additional episodes of gel formation were remedied with further additions of seeding material and water. Heating continued for about 4 hours over which time the temperature rose to about 120° C. and the desired slurry began to form, at which time the vacuum was removed. Heating continued, the pot temperature rose to 160° C., and the temperature was then held at 160° C. for two hours to complete the formation of a homogeneous slurry. The pot temperature was then lowered to 60° C. and the homogeneous slurry was stirred at 60° C. for 36 hours.

Figure 1:
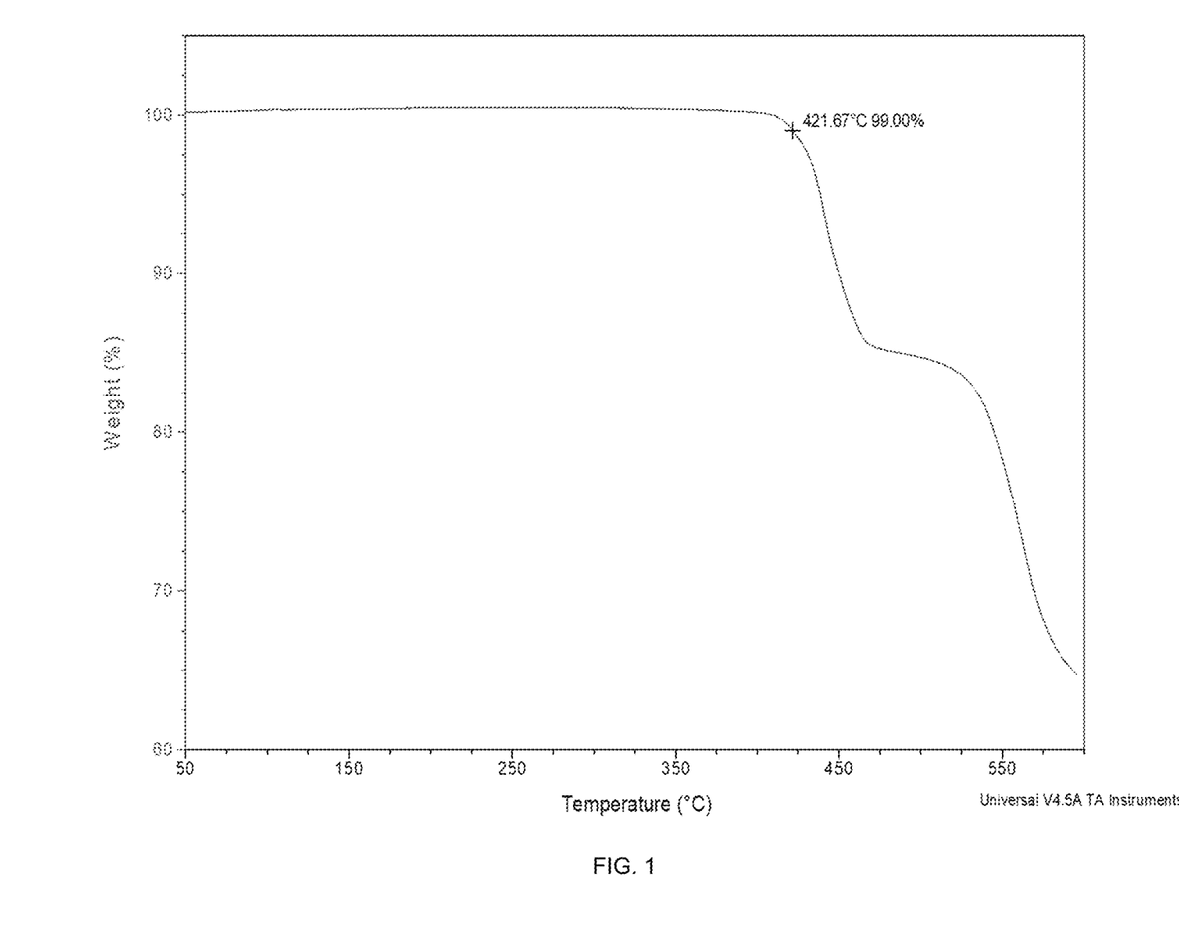
FIG. 1 shows the result of thermogravimetric analysis (TGA) of an exemplary flame retardant material produced according to Example 1 of the present disclosure.
Figure 2:
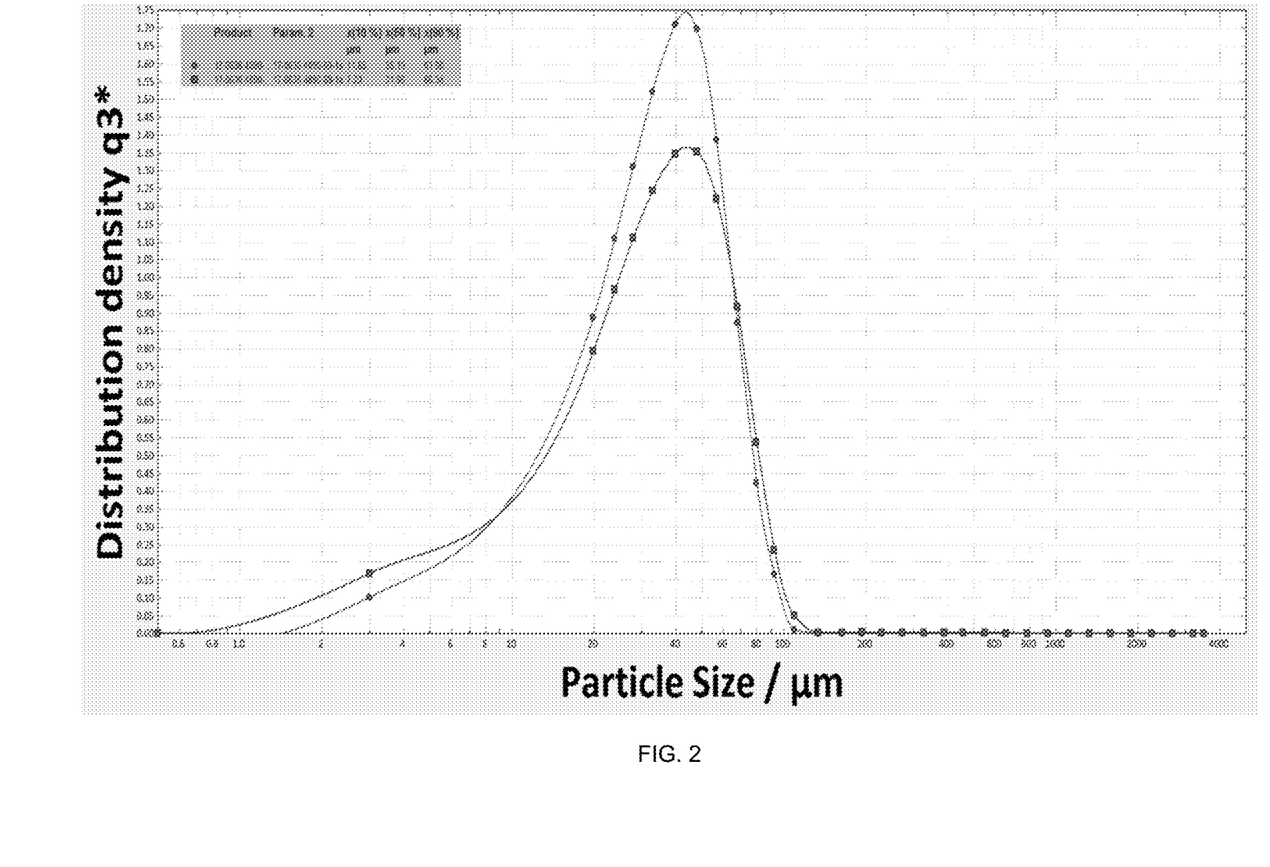
FIG. 2 shows the particle size distribution of the exemplary flame retardant of Example 1.
Figure 3:
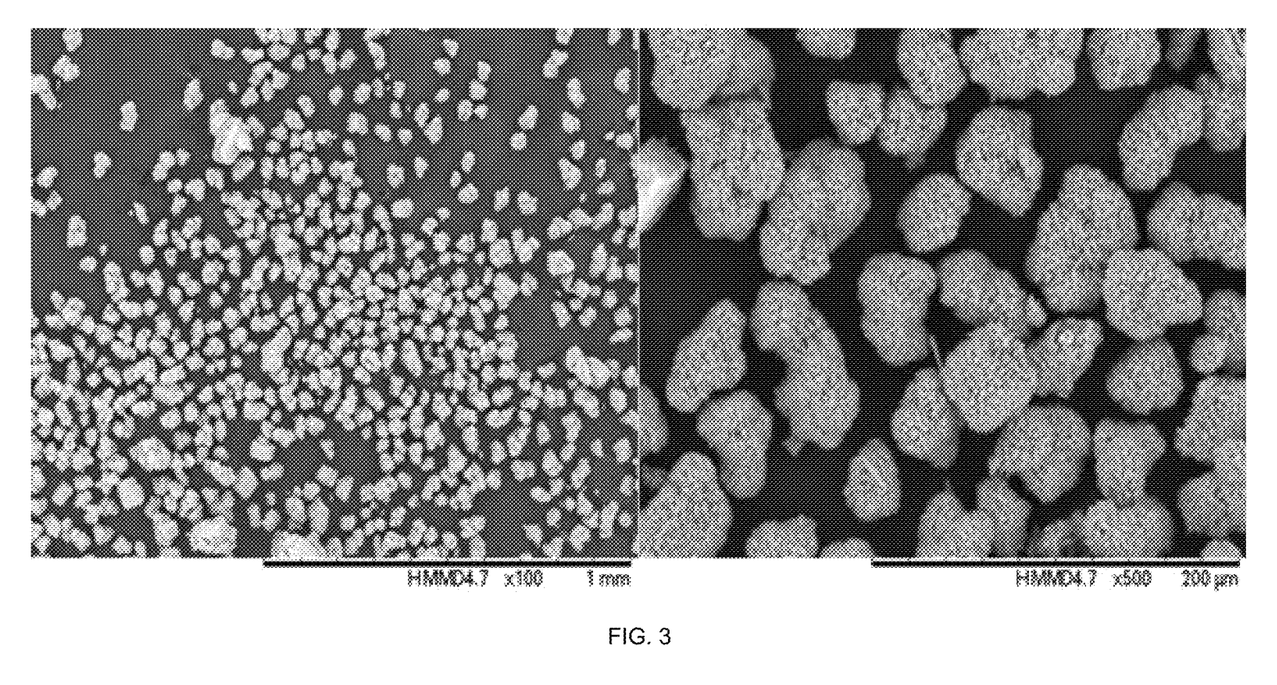
FIG. 3 shows scanning electron microscope (SEM) images of the exemplary flame retardant of Example 1.

The reaction mixture was then gradually heated to 250° C. and held at that temperature for 3 hours producing a suspension of fine white particles. The reaction mixture was cooled to 60° C., filtered, and the solid was washed with IPA (500 mL×3) to afford a white powder and pale yellow filtrate. No phosphorus compounds were detected in the filtrate by $^{31}$P NMR. The solid was then dried at 160° C. for 1 hour to yield the product as 370 grams of white powder (99% yield). The powder was readily sifted through 325 mesh screen (87% was sifted in 1 day) and had a free flowing and non-fluffy physical appearance. Thermogravimetric analysis (TGA) conducted in $N_2$ showed that product was thermally stable to >400° C. (FIG. 1). Elemental analysis (ICP-OES) was as follows: 31.0% P, 9.0% Al. The BET surface area of the product was approximately 2.5 to 2.6 $m^2/g$ and bulk density was 0.53 g/mL. Particle size distribution and SEM images of the product are shown in FIGS. 2 and 3, respectively.

Example 2

An aqueous solution of tris-[methylphosphonic acid] aluminum salt, prepared from MPA and aluminum isopropoxide, was added along with sulfolane, at a weight ratio of 100 grams of sulfolane per 15 grams of aluminum salt, to a 4-neck 5 L round bottom flask equipped with overhead stirrer, addition funnel and Vigreux column with Dean-Stark trap.

Figure 4:
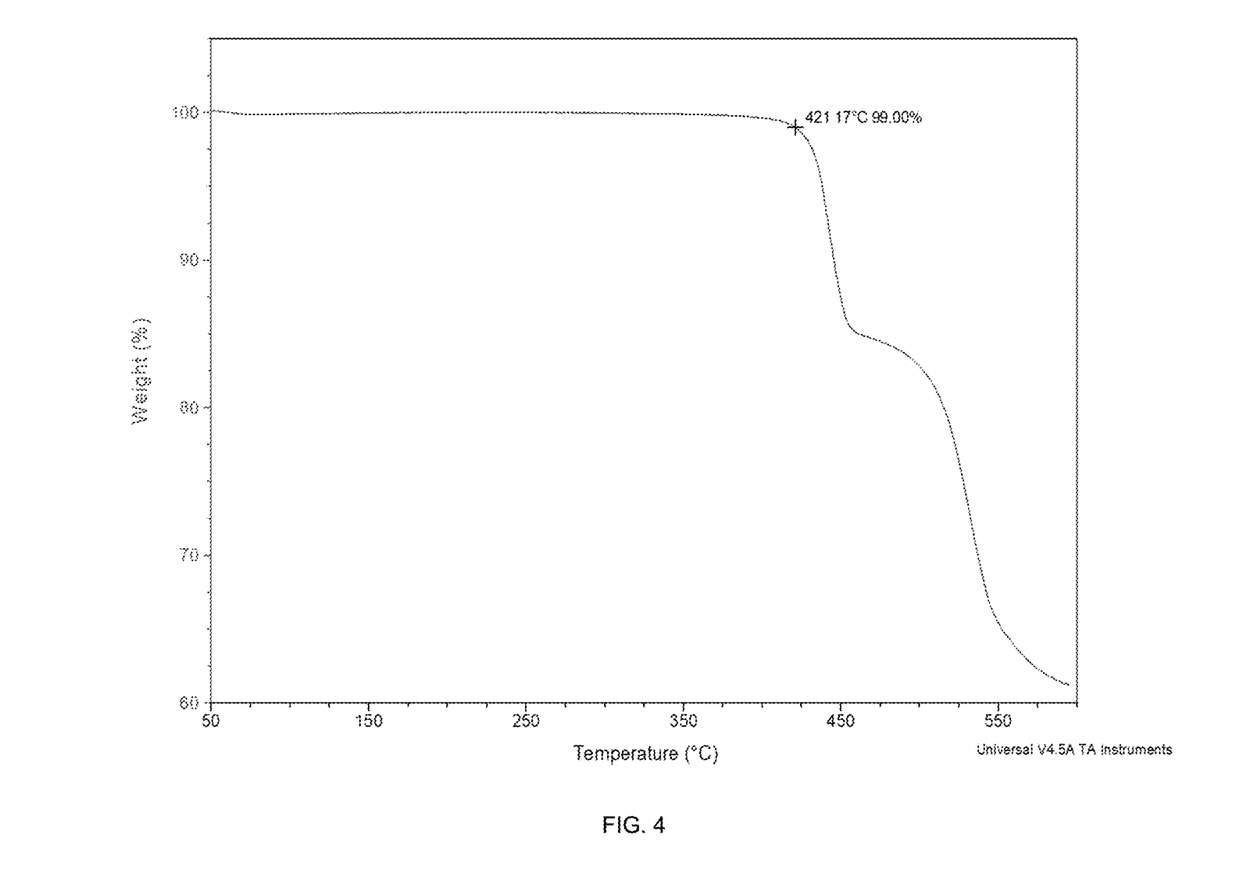
FIG. 4 shows the result of TGA of an exemplary flame retardant material produced according to Example 2 of the present disclosure.

The reaction mixture was stirred under nitrogen at 90° C. for 4 hours to afford a homogeneous white suspension. The reaction mixture was then gradually heated to 250° C. and held at 250° C. for 3 hours. The off-white suspension was then cooled to 60° C., the sulfolane was filtered off, and the solid washed with isopropanol (500 mL×3). The solid was then dried in 160° C. oven for 1 hour to afford the product as a white powder (142 g) with 92% yield. TGA conducted in $N_2$ showed that the product was thermally stable to >400° C. (FIG. 4). Elemental analysis (ICP-OES) was as follows: 26.7% P, 8.5% Al.

Comparative Example 3

Figure 5:
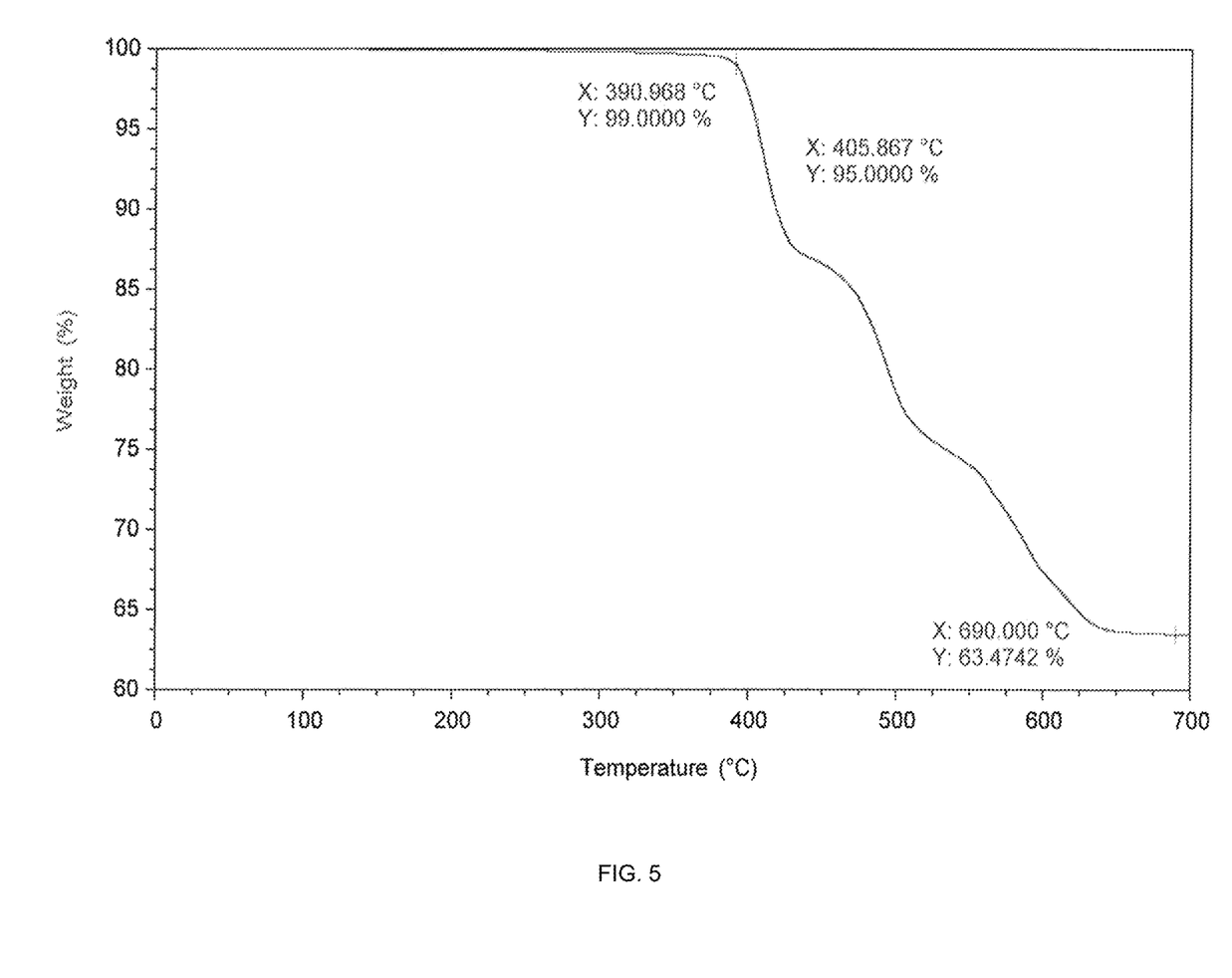
FIG. 5 shows the result of TGA of a flame retardant material produced according to Comparative Example 3 of the present disclosure.

To a pre-weighed 1 L resin kettle was charged 282.3 g ethyl phosphonic acid (EPA) and 157 mL DI $H_2O$. The reactor was placed in an ice bath and incremental amounts of solid Al(O—$^i$Pr)$_3$ were added to the EPA solution with stirring, totaling 174.7 g Al(O—$^i$Pr)$_3$. Following the addition, the pot temperature was maintained at or below 20° C. using the ice bath for about 15 minutes, at which point the ice bath was removed and the pot warmed to room temperature. The mixture was stirred until no aluminum isopropoxide was visible (at least 5 h). A milky white mixture formed, which was then concentrated using a distillation head and pump. The thickened mixture was poured into a 1 L beaker, placed in a 100° C. programmable oven, and heated to 160° C. over 8 h and held for 8 h. The temperature was increased to 230° C. over 2 h and held for 6 h. The resulting product formed as a solid mass and was cooled to room temperature. The solid mass was coarsely crushed with a mortar and pestle and heat treated again to 230° C. over 1 h and held for 4 h. The product was reground and transferred to a dry container with a yield of 276.4 g (96.2%). TGA conducted in $N_2$ showed that the product was thermally stable to >350° C. (FIG. 5).

Example 4

Flame retardant activity of the material produced according to the present disclosure was excellent and no difficulties compounding the material into polymer compositions were observed. UL-94 ratings of V-0@0.8 mm were measured for:

A) polyamide 66 compositions comprising 30 wt % glass fiber, 13.7 wt % FR ½, and 10% melem; and B) polyphthalamide compositions comprising 25 wt % glass fiber, and 16.7 wt % FR ½, wherein FR1/2 represents the flame retardant material prepared according to Example 1 in one series of tests and the flame retardant material prepared according to Example 2 in a separate series of tests.

In particular, as shown in Table 1 below, polymer compositions were prepared and evaluated for flame retardant activity under UL94 testing. As indicated in Table 1, certain of the compositions also included melem (melamine condensation product) as a synergist. Formulations 1 and 2 containing 56.3 parts Nylon 66, 30 parts glass, 13.7 parts flame retardant FR1/2, and 10 parts Melem were made by compounding at 265° C. and molding into ¹⁄₁₆" and ¹⁄₃₂" bars, respectively, at 280° C. Formulation 3 containing 58.3 parts polyphthalamide, 25 parts glass, and 16.7 parts flame retardant FR1/2 were made by compounding at 320-330° C. and molding into ¹⁄₃₂" bars at 320-330° C. The formulations were evaluated according to UL 94, and the results are shown in Table 1.

The results demonstrated that the flame retardants produced according to Example 1 and Example 2 each achieved the best UL-94 vertical burning test rating, V-0, at different sample thicknesses (whereas the polymer composition without the flame retardant (Formulation 4) failed the UL 94 test). The results from Formulation 3 also showed that the flame retardants produced according to Example 1 and Example 2, each in glass-filled semi-aromatic nylon, achieved the best UL-94 vertical burning test rating, V-0 at 1/32".

TABLE 1

| | Formulation | | | |
|---|---|---|---|---|
| | 1 | 2 | 3 | 4 |
| Nylon 66 | 56.3 | 56.3 | — | 70 |
| Polyphthalamide | — | — | 58.3 | — |
| Glass | 30 | 30 | 25 | 30 |
| FR1/2 | 13.7 | 13.7 | 16.7 | — |
| Melem (synergist) | 10 | 10 | — | — |
| UL 94 @ 1/16" | V-0 | — | — | Fail |
| UL 94 @ 1/32" | — | V-0 | V-0 | Fail |

Although particular embodiments of the present invention have been illustrated and described, it will be apparent to those skilled in the art from consideration of the specification and practice of the present disclosure that various modifications and variations can be made without departing from the scope of the invention, as claimed. Thus, it is intended that the specification and examples be considered as exemplary only, with a true scope of the present invention being indicated by the following claims and their equivalents.

What is claimed is:

1. A process for preparing a thermally stable phosphorus containing flame retardant material comprising:
   heating to a reaction temperature of 200° C. or higher a mixture comprising
   i) a majority by weight, based on the weight of the mixture, of one or more high boiling, water miscible, acid stable solvents having a boiling point of greater than 200° C., and
   ii) one or more phosphonic acid salts of formula (I):

(I)

wherein R is H, an alkyl, aryl, alkylaryl or arylalkyl group, p is a number of from 2 to 7, M is a metal, y is a number of from 2 to 7, so that M(+)y is a metal cation where (+)y represents the charge formally assigned to the cation,
   to produce the flame-retardant material as a powder or in small particle form.

2. The process according to claim 1, further comprising, prior to the step of heating the mixture at temperatures of 200° C. or higher,
   a) providing the one or more salts of formula (I) in a solid or liquid form, and
   b) preparing the mixture by combining the one or more salts of formula (I) provided in a) with the one or more high boiling, water miscible, acid stable solvents under conditions and for a time sufficient to form a suspension or slurry.

3. The process according to claim 2, wherein the one or more salts of formula (I) are provided as a solution in an aqueous solvent.

4. The process according to claim 2, wherein the step of preparing the mixture occurs at one or more elevated temperatures in a range of from about 30° C. to about 160° C.

5. The process according to claim 1, wherein the one or more high boiling, water miscible, acid stable solvents comprise one or more sulfones.

6. The process according to claim 1, wherein the one or more high boiling, water miscible, acid stable solvents are selected from the group consisting of sulfones.

7. The process according to claim 5, wherein the sulfones are of the formula $R_1R_2SO_2$, wherein $R_1$ and $R_2$ are independently chosen from $C_{1-6}$ hydrocarbon groups or $R_1$ and $R_2$ taken together with S form a ring having 2, 3, 4, or 5 carbon atoms.

8. The process according to claim 7, wherein $R_1$ and $R_2$ are independently chosen from $C_{1-3}$ alkyl.

9. The process according to claim 8, wherein $R_1$ and $R_2$ are both methyl or both ethyl.

10. The process according to claim 7, wherein $R_1$ and $R_2$ taken together with S form a tri-, tetra-, or penta-methylene ring.

11. The process according to claim 10, wherein $R_1$ and $R_2$ taken together with S form a tetra-methylene ring.

12. The process according to claim 1, wherein p=y.

13. The process according to claim 1, wherein the mixture is heated to a reaction temperature in a range of from about 220° C. to about 400° C.

14. The process according to claim 1, wherein the median particle size of the powder or small particles is about 100 μm or less, as measured by laser diffraction according to ISO 13320.

15. The process according to claim 14, wherein the median particle size is from about 20 μm to about 80 μm.

16. The process according to claim 1, wherein, in formula (I), R is H, $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl; and M is Mg, Ca, Ba, Zn, Zr, B, Al, Si, Ti, Cu, Fe, Sn or Sb.

17. The process according to claim 16, wherein, in formula I, R is $C_{1-12}$ alkyl and M is Ca, Zn, B, Al, Fe or Sn.

18. The process according to claim 17, wherein M is Fe, Ca or Al.

19. A method for improving the flame retardancy of a polymer, comprising:
   heating at a reaction temperature of 200° C. or higher a mixture comprising
   i) a majority by weight, based on the weight of the mixture, of one or more high boiling, water miscible, acid stable solvents having a boiling point of greater than 200° C., and
   ii) one or more phosphonic acid salts of formula (I):

(I)

wherein R is H, an alkyl, aryl, alkylaryl or arylalkyl group, p is a number of from 2 to 7, M is a metal, y is a number of from 2 to 7, so that M(+)y is a metal cation where (+)y represents the charge formally assigned to the cation, to form a flame-retardant material;
separating the flame retardant material from the solvent to yield the flame retardant material as a powder or in small particle form;
and combining the flame retardant material with the polymer.

* * * * *